United States Patent

Schümann et al.

Patent Number: 5,807,637
Date of Patent: Sep. 15, 1998

[54] POLYURETHANE-BASED SELF-ADHESIVE TAPE

[75] Inventors: Uwe Schümann, Pinneberg; Wolfgang Schacht, Wulmstorf; Karsten Seitz, Buxtehude; Peter Jauchen, Hamburg, all of Germany

[73] Assignee: Beiersdorf AG, Hamburg, Germany

[21] Appl. No.: 823,267

[22] Filed: Mar. 24, 1997

[30] Foreign Application Priority Data

Apr. 13, 1996 [DE] Germany .......... 196 14 620.8

[51] Int. Cl.$^6$ .............. B32B 7/10; B32B 27/40
[52] U.S. Cl. ............ 428/423.1; 428/219; 428/220; 428/354; 428/414; 428/423.3; 428/423.5; 428/424.2; 428/424.4; 428/425.3
[58] Field of Search .............. 428/423.1, 424.2, 428/424.4, 414, 423.3, 423.5, 425.3, 354, 219, 220; 524/590

[56] References Cited

U.S. PATENT DOCUMENTS 5,516,581  5/1996  Kreckel ................ 428/354

*Primary Examiner*—Patricia A. Short
*Attorney, Agent, or Firm*—Sprung Kramer Schaefer & Briscoe

[57] ABSTRACT

Pressure-sensitive self-adhesive tape comprising a backing which is coated on both sides with pressure-sensitive adhesive compositions and is composed a) in a proportion by weight of up to 50% by weight, in particular from 10% by weight to 40% by weight, of a crosslinked, non-foamed polyurethane, b) in a proportion by weight of from 40% by weight to 70% by weight of fillers, c) in a proportion by weight of from 5% by weight to 30% by weight, in particular from 10% by weight to 25% by weight, of plasticizers and resins, and d) if desired, of further auxiliaries.

9 Claims, No Drawings

POLYURETHANE-BASED SELF-ADHESIVE TAPE

The invention describes a double-sided self-adhesive tape which is on the one hand capable of taking on gap-bridging sealing functions and on the other hand achieves bond strengths as are typical of commercially available high-performance adhesive tapes. The product is suitable for obtaining bonds which are stable at both high and low temperatures.

In order to obtain high strengths in respect of peeling and shear forces, the use of various adhesive tapes is known.

DE-C 2105877 indicates an adhesive tape consisting of a backing coated on at least one side with a microcellular, pressure-sensitive adhesive, the adhesive layer of which includes a nucleating agent, the cells of the adhesive layer being closed and distributed completely within the layer of adhesive. This adhesive tape is able to adapt to the irregular surface on which it is placed and can therefore lead to a relatively durable bond, nevertheless displaying only a relatively low level of recovery if compressed to half of its original thickness. The cavities in the adhesive composition, however, offer openings for the lateral entry of solvents and water into the joint, which is highly undesirable in the case, for example, of stuck-on trim strips in car making. In addition, it is impossible to rule out the complete penetration of solvents or water through the entire adhesive tape.

EP 601 582 A describes an adhesive tape which consists of a foamed elastomer core to which a pressure-sensitive adhesive layer has been applied.

Here too, there are the disadvantages resulting from the principle of the cavities, namely that the core of the adhesive tape can, like a sponge, suck up moisture or solvent. This may lead to a weakening of the bond strength. Furthermore, as a result of the principle of the foamed elastomer core, a resilience occurs in the adhesive bonds that can lead to premature failure of these adhesive bonds.

DE-C 28 21 606 describes a pressure-sensitive adhesive tape which evades the abovementioned disadvantages in that the backing material is filled with hollow glass microspheres in a proportion of up to 60 percent by volume. After bonding, elastic resilience does not occur in this case because the surfaces adhere to the opposite sides of each cell and prevent resilience. However, this adhesive tape too is hampered by some disadvantages. For instance, hollow glass microspheres are highly sensitive structures which have a tendency to shatter in the course of incorporation into the adhesive layer, in the course of storage, and especially during the use of the tape, with subsequent secondary problems owing to the splinters produced.

DE-A 40 29 896 describes a double-sided self-adhesive tape which has no backing and comprises a pressure-sensitive adhesive layer containing solid glass microspheres. True, relative to the abovementioned adhesive tapes this adhesive tape has the undisputed property of leading to permanent bonds, but owing to the solid glass microspheres its utility is limited.

All of the adhesive tapes mentioned above have the common feature that the degree to which the shear forces which act on the adhesive bond can be absorbed is, for many applications, insufficient to ensure a permanent bond between the substrate and the article that is to be mounted using the adhesive tape. For instance, especially at relatively low temperatures, the possibility of using such adhesive tapes is very limited, since at low temperatures the backing becomes brittle with the result that the adhesive tape is no longer able to maintain the desired adhesive bond.

Furthermore, none of the abovementioned adhesives is able to bridge gaps more than 0.5 cm wide and seal them. Adhesive tapes which are capable of this, for example butyl tapes, achieve only very low strengths in relation to shear and tipping-shear stresses, especially at elevated temperatures.

Also known is a laminate comprising a polyurethane and a pressure-sensitive adhesive layer. Such a laminate is disclosed, for example, in WO 86/00536, a description of a tablet pack and tablet administration form. In this document, a polyurethane film which has undergone no further processing is provided with a self-adhesive coating which surrounds a tablet and is bonded simultaneously with the tablet on the skin of the user.

In addition, U.S. Pat. No. 5,127,974 refers to a laminate comprising a known polyurethane film having a self-adhesive coating. This laminate is employed therein specifically for the temporary protection of coated surfaces of automobiles.

A double-sided adhesive tape based on a polyurethane substrate as described above and on a pressure-sensitive adhesive layer laminated onto both sides is not described in the abovementioned documents, but has, furthermore, the disadvantage of elastic resilience in the backing, which resilience cannot be absorbed and would therefore lead to a weakening of the bond strength.

The object of the invention is to provide a self-adhesive tape which does not have the disadvantages of the prior art, or at least has them to a lesser extent, and which is nevertheless not restricted in its utility like the abovementioned products.

To achieve this object the invention proposes a pressure-sensitive self-adhesive tape coated on both sides with adhesive compositions, the backing of which tape is formed by a formulated, crosslinked, non-foamed polyurethane.

As one constituent of the backing, a crosslinked, non-foamed polyurethane is employed which is formulated with additional components, namely fillers, plasticizers and resins and, if desired, further auxiliaries. The proportion of polyurethane in the backing is up to 5 50% by weight, preferably from 10% by weight to 40% by weight. The fillers make up from, 40% by weight to 70% by weight of the backing, while the plasticizers and resins together are employed in proportions of from 5% by weight to 30% by weight, in particular from 10% by weight to 25% by weight.

The selection of the isocyanate component of the polyurethane depends on the specific properties to be established in the backing. Suitable examples are tolylene diisocyanate, diphenylmethane 4,4'-diisocyanate, dicyclohexylmethane 4,4'-diisocyanate, hexamethylene diisocyanate, isophorone diisocyanate, mixtures of the abovementioned isocyanates or isocyanates chemically derived therefrom, examples being dimerized or trimerized types.

The selection of the component reacting with the isocyanate likewise depends on the properties that are to be established in the backing as a function of the set of requirements desired. Suitable examples are all polyester diols, polyester triols and polyester polyols, polyether diols, polyether triols and polyether polyols. In addition to the isocyanate components enumerated above and the components which react with them, however, it is also possible to use other starting materials to form the polyurethane, without departing from the concept of the invention.

Polyurethanes as described above are prior-art in their preparation and are described, for example, in "Ullmann's Encyclopedia of Industrial Chemistry, Vol. A21: Polyurethanes".

The formulation of polyurethane compositions is likewise prior art and is employed in particular in connection with the preparation of sealing compounds (cf. "Ullmann's Encyclopedia of Industrial Chemistry, Vol. A23: Sealing Materials").

In a particularly preferred embodiment of the self-adhesive tape, the polyurethane is formed using a hydroxyl-functionalized polybutadiene in conjunction with a diisocyanate.

Fillers which can be employed include both reinforcing fillers, for example carbon black, and non-reinforcing fillers, for example chalk or barium sulphate. Further examples are talc, mica, silicic acid, silicates or zinc oxide. Mixtures of the substances mentioned can also be employed.

Examples of plasticizers are phthalates or paraffinic, naphthenic or aromatic mineral oils. Resins which can be used are phenolic resins, hydrocarbon resins or bitumen.

To increase the ageing stability of the adhesive tape it can be blended with customary anti-ageing agents, which, depending on the particular case, may come from the class of discolouring or non-discolouring anti-ageing agents, specifically in the range between 0% by weight and 5% by weight, and also known light stabilizers in the range between 0% by weight and 5% by weight or ozone protection agents in the range between 0% by weight and 5% by weight.

To obtain freedom from bubbles it is possible, furthermore, to admix drying agents to the formulation, examples being calcium oxide or molecular sieve zeolites, in particular in the range between 0% by weight and 10% by weight.

Depending on the intended use of the self-adhesive tape, all of the auxiliaries mentioned can be employed either alone or in any desired combination with one another to prepare the polyurethane composition, in order to obtain optimum compatibility with the utility. Through the use of these additives it is also possible without problems to provide for the black coloration that is required, in particular, by the motor vehicle industry.

The backing mixture is preferably prepared in a planetary mixer or compounder. To obtain freedom from bubbles, operation is carried out under vacuum. The viscosity of the mixture is adjusted such that it is between $10^0$ and $10^4$ Pa*s at room temperature. Solvent-free processing is preferred.

The mixture can subsequently be spread out on customary commercial coating machines in any desired thickness between 0.1 mm and 50 mm, preferably between 0.4 mm and 20 mm.

This is followed by chemical crosslinking in a drying tunnel, preferably at temperatures from 40° C. to 180° C., or by means of storage at room temperature.

Adhesive compositions which can be used are generally previously known adhesive compositions on a rubber or acrylate basis.

In order to enhance the anchoring of the adhesive composition on the backing it is possible to add known adhesion promoters. As an alternative to this, corona pretreatment can also be carried out. In order to obtain particularly firm anchoring, it is possible to use a combination of the techniques listed.

In order to prevent the migration of, say, plasticizers from the backing into the adhesive coating and at the same time to enhance the anchoring of the adhesive coating on the backing, a layer of coating agent can be applied between backing and adhesive coating. The coating agent in this case is preferably from the group consisting of the polyamide, epoxy, phenolic, urea-formaldehyde, melamine-formaldehyde and polyurethane resins.

The adhesive composition can be applied directly, by an indirect transfer method or by coextrusion with the backing, from solution, dispersion or the melt. The coating weight of the adhesive composition can likewise be chosen as desired, depending on the intended use, within the range from 10 $g/m^2$ to 250 $g/m^2$, preferably from 40 $g/m^2$ to 150 $g/m^2$.

A self-adhesive tape as described above consisting essentially of a laminate of a formulated polyurethane composition and a pressure-sensitive adhesive layer and characterized by a three-layer structure comprising adhesive layer/formulated polyurethane composition/adhesive layer is novel relative to the prior art.

Owing to the formulation of the polyurethane with plasticizers and resins and also fillers, the self-adhesive tape exhibits outstanding product properties which could not have been foreseen in such a way even for the skilled worker.

Plasticizers and resins and also fillers take a part of the elastic resilience from the polyurethane backing and therefore contribute to the permanent bond strength of the adhesive bonds.

As a result of the high flexibility of the backing, the adhesive tape adapts very well to an uneven substrate if pressed onto such a substrate using a certain pressure. This produces a highly durable bond between adhesive tape and substrate, which does not fail even under the action of high shear forces on the self-adhesive tape. As a result of the lack of laterally open cavities within the backing, the possibility of solvent or water penetration into the adhesive tape, with all of its known disadvantages, is also prevented. Since the adhesive tape of the invention can be produced in thicknesses of 2 cm or more, it can also be employed as a self-adhesive, gap-bridging sealing tape.

Owing to the very low glass transition point of the adhesive tape, low-temperature applications of down to −40° C. are possible, since the embrittlement otherwise observed with known adhesive tapes does not occur, with the result that optimum adhesion of the adhesive tape is ensured even at these extreme temperatures.

The good thermal stability and ageing stability of the adhesive tape, brought about by the non-foamed consistency of the backing which prevents the penetration of moisture and atmospheric oxygen, also enables application at relatively high temperatures of from 70° C. to 100° C.

Low-temperature and high-temperature resistance capacities are required, for example, in connection with the adhesive bonding of trim strips or mirrors in automotive construction, since the motor vehicles are sometimes driven in very cold zones or, respectively, very hot regions of the earth where there is a high level of solar irradiation.

The invention is also used, apart from in the automotive industry, in the furniture and construction industry, where there is likewise a need to anchor mirrors, trims or covers permanently to the substrate.

In view of the outstanding properties, however, the use of the invention is not restricted to the examples given. Rather, the adhesive tape can be used in numerous sectors of industry as an assembly material when the task involved is to create a secure bond between two components of very different materials on a relatively uneven surface.

In the text below the intention is to illustrate the invention in more detail, with reference to working examples, without thereby wishing to impose unnecessary restrictions on the invention.

EXAMPLES

Table 1 lists the materials used to prepare the backing, in each case with trade names and manufacturers. The chemicals cited are all freely obtainable commercially.

The starting materials are in each case employed in different proportions depending on the intended use of the self-adhesive tape.

TABLE 1

Materials employed for preparing the backing, with trade names and manufacturers

| Trade name | Chemical basis | Manufacturer |
| --- | --- | --- |
| Poly bd R45HT ® | Hydroxyl-functionalized polybutadiene | Elf Atochem |
| Santicizer 261 ® | Benzyl octyl phthalate | Monsanto |
| Omyacarb 4BG ® | Chalk | OMYA |
| Bitumen B 65 ® | Bitumen | Elf Bitumen Deutschland |
| Weißfeinkalk ® | Calcium oxide | RWK |
| Printex 30 ® | Carbon black | Degussa |
| Desmodur CD ® | Modified diphenylmethane 4,4'-diisocyanate | Bayer |
| Vestanat IPDI ® | Isophorone diisocyanate | Hüls |

Below there are listed three formulations for the preparation of novel backings, each in the form of a table. In this context, the materials used are always processed in the manner described below.

| Example 1 | |
| --- | --- |
| Poly bd R45HT | 18.0 kg |
| Santicizer 261 | 20.0 kg |
| Omyacarb 4BG | 49.8 kg |
| Fine white lime | 3.0 kg |
| Printex 30 | 7.0 kg |
| Desmodur CD | 2.2 kg |
| Example 2 | |
| Poly bd R45HT | 18.0 kg |
| Bitumen B 65 | 15.0 kg |
| Omyacarb 4BG | 54.8 kg |
| Fine white lime | 3.0 kg |
| Printex 30 | 7.0 kg |
| Desmodur CD | 2.2 kg |
| Example 3 | |
| Poly bd R45HT | 18.0 kg |
| Bitumen B 65 | 15.0 kg |
| Omyacarb 4BG | 55.3 kg |
| Fine white lime | 3.0 kg |
| Printex 30 | 7.0 kg |
| Vestanat IPDI | 1.7 kg |

The components in the abovementioned examples are mixed with one another for two hours in a customary commercial planetary mixer, the isocyanate not being added until 15 minutes before the end of the mixing operation. In order to obtain a bubble-free product, the mixture is degassed for the last 10 minutes of the operation by applying an underpressure of less than 15 torr. In each case a pseudoplastic paste is obtained which can be processed further at room temperature, with a viscosity in the range from 50 Pa*s to 5000 Pa*s.

The pastes are subsequently applied by spreading to commercially available, double-sided siliconized paper, in a commercially available coating unit, to form a web with a thickness of 1 mm, and in the subsequent passage through the drying tunnel are crosslinked to form an elastomer at a temperature of from 120° C. to 180° C. with a residence time of from 10 min to 30 min. After curing and subsequent storage at room temperature for one week, the backings have a Shore A hardness of from 50 to 90, a glass transition temperature in the range from −60° C. to −70° C. and a tensile strength of more than 1 N/mm$^2$ with an elongation at break of less than 500%.

The material is subsequently coated in two steps on both sides with 60 g/m$^2$ per side of the polyacrylate composition Durotac 280-1753 from National Starch. Coating with the solvent composition is carried out after an in-line corona treatment directly on the backing. It is crosslinked at 100° C. and dried. The resulting double-sided adhesive tape is covered on one side with release paper.

The double-sided adhesive tape is distinguished by high adhesive forces coupled with high shear strength, and the adhesive bonds produced therewith possess excellent low-temperature impact strength. The material forms a good seal against moisture.

We claim:

1. Pressure-sensitive self-adhesive tape comprising a backing coated on both sides with pressure-sensitive adhesive compositions, which backing is comprised of
   a) 10% to 50% by weight of a crosslinked, non-foamed polyurethane,
   b) 40% to 70% by weight of fillers,
   c) 5% to 30% by weight of plasticizers and resins, and
   d) optionally, further auxiliaries.

2. Pressure-sensitive self-adhesive tape according to claim 1, wherein the polyurethane is formed using
   a hydroxyl-functionalized polybutadiene and
   a diisocyanate.

3. Pressure-sensitive self-adhesive tape according to claim 1, wherein the reinforcing or non-reinforcing fillers employed are selected from the group consisting of carbon black, chalk, barium sulphate, talc, mica, silicic acid, silicates and zinc oxide.

4. Pressure-sensitive self-adhesive tape according to claim 1, wherein the plasticizers employed are phthalates or paraffinic, naphthenic or aromatic mineral oils and the resins employed are phenolic resins, hydrocarbon resins or bitumen.

5. Pressure-sensitive self-adhesive tape according to claim 1, wherein the auxiliaries employed are
   discoloring or non-discoloring anti-ageing agents in the amount of from 0% by weight to 5% by weight,
   light stabilizers in an amount of from 0% by weight to 5% by weight,
   ozone protection agents in the amount of from 0% by weight to 5% by weight, and
   drying agents in the amount of from 0% by weight to 10% by weight.

6. Pressure-sensitive self-adhesive tape according to claim 1, wherein the backing has a thickness of from 0.1 mm to 50 mm.

7. Pressure-sensitive self-adhesive tape according to claim 1, wherein between backing and adhesive coating there is applied a layer of a coating agent selected from the group consisting of polyamide, epoxy, phenolic, urea-formaldehyde, melamine-formaldehyde and polyurethane resins.

8. Pressure-sensitive self-adhesive tape according to claim 1, wherein the adhesive composition is applied to the backing in a weight per unit area of from 10 g/m$^2$ to 250 g/m$^2$.

9. A method for closing off a gap, which comprises applying the pressure-sensitive tape of claim 1 thereto.

* * * * *